United States Patent
Maeda et al.

(10) Patent No.: US 9,917,958 B2
(45) Date of Patent: Mar. 13, 2018

(54) PRINTING APPARATUS AND CONTROL METHOD OF PRINTING APPARATUS REQUESTING PRINT JOB FROM SERVER SYSTEM BASED ON DETECTED EVENT

(71) Applicant: CANON KABUSHIKI KAISHA, Tokyo (JP)

(72) Inventors: Masao Maeda, Kawasaki (JP); Kiyoshi Katano, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/407,680

(22) Filed: Jan. 17, 2017

(65) Prior Publication Data

US 2017/0223199 A1 Aug. 3, 2017

(30) Foreign Application Priority Data

Jan. 29, 2016 (JP) .................... 2016-015078

(51) Int. Cl.
| | |
|---|---|
| G06F 15/00 | (2006.01) |
| G06F 3/12 | (2006.01) |
| G06K 1/00 | (2006.01) |
| H04N 1/00 | (2006.01) |
| H04N 1/327 | (2006.01) |

(52) U.S. Cl.
CPC ....... *H04N 1/00228* (2013.01); *G06F 3/1206* (2013.01); *G06F 3/126* (2013.01); *G06F 3/1236* (2013.01); *H04N 1/00307* (2013.01); *H04N 1/00344* (2013.01); *H04N 1/32765* (2013.01); *H04N 2201/0039* (2013.01); *H04N 2201/0094* (2013.01)

(58) Field of Classification Search
CPC .......... H04N 1/00228; H04N 1/00307; H04N 1/00344; H04N 1/32765; H04N 2201/0039; H04N 2201/0094; G06F 3/1206; G06F 3/1236; G06F 3/126
USPC ............... 358/1.15, 1.13, 1.14, 1.1
See application file for complete search history.

(56) References Cited

U.S. PATENT DOCUMENTS

| | | | |
|---|---|---|---|
| 7,213,138 B2 | 5/2007 | Fukunaga | |
| 8,941,866 B2 | 1/2015 | Katano | |
| 2008/0297837 A1* | 12/2008 | Soda | G06K 15/00 358/1.15 |
| 2011/0128579 A1* | 6/2011 | Igarashi | G06F 3/1207 358/1.15 |

FOREIGN PATENT DOCUMENTS

JP 2005-88301 4/2005

* cited by examiner

*Primary Examiner* — Douglas Tran
(74) *Attorney, Agent, or Firm* — Fitzpatrick, Cella, Harper & Scinto

(57) ABSTRACT

A processing apparatus transmits a request to an external apparatus server for a job on a condition that a predetermined time has elapsed from detection of a predetermined event by a detection unit.

17 Claims, 14 Drawing Sheets

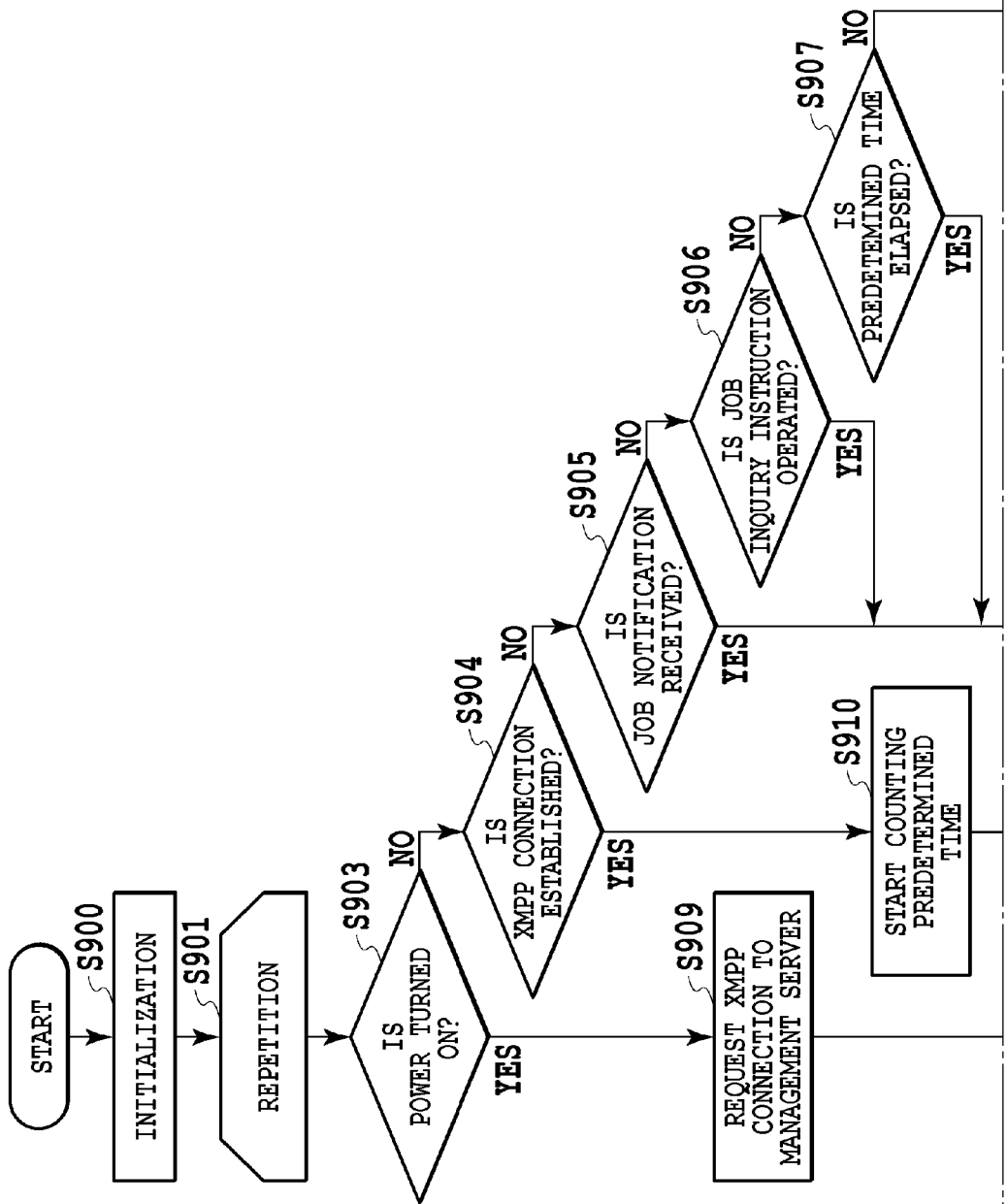

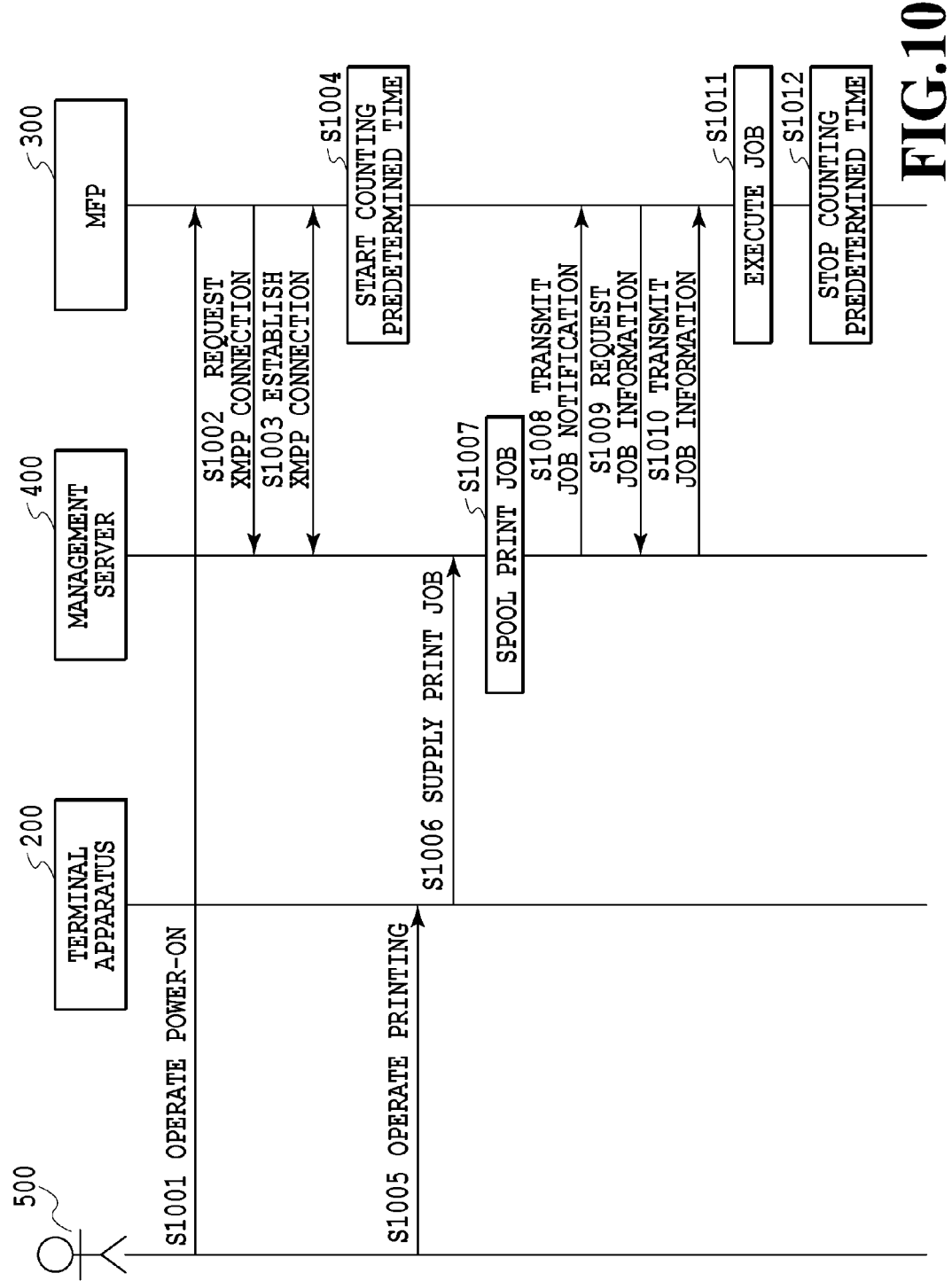

PRINTING APPARATUS AND CONTROL METHOD OF PRINTING APPARATUS REQUESTING PRINT JOB FROM SERVER SYSTEM BASED ON DETECTED EVENT

BACKGROUND OF THE INVENTION

Field of the Invention

The present invention relates to a processing system including a management server and a processing apparatus which executes processing based on data to be transmitted from the management server.

Description of the Related Art

Due to the recent diffusion of cloud services, there are provided various services achieved by combining a management server located at the cloud service and a processing apparatus connected to the management server via a network. For example, there is provided a cloud printing system in which a print job transmitted from a user's terminal apparatus to the print management server located at the cloud service via a network is acquired by a printer which is the processing apparatus from the print management server via the network for printing.

In the cloud printing system, each of the printers is required to acknowledge that a job directed to its own is held in the print management server. In order to achieve this, the following system is conceivable. Namely, there is a so-called push notification system in which the print management server who received a job from the user's terminal notifies the printer of job occurrence and the printer having received such notification acquires the job from the print management server for the printing.

However, in the case where the job is supplied from the user's terminal in a state in which the power of the printer is turned off, the printer may not be able to receive the push notification from the print management server. In this case, even if the printer is turned on afterwards, the printer cannot acknowledge presence/absence of the job which has been supplied during its power-off state, and as a result, the job may not be able to automatically executed. Japanese Patent Laid-Open No. 2005-88301 discloses a technique of a printer accessing a server and inquiring whether image data is stored in the server after initial setting of the printer at the time of turning on the power of the printer.

However, in the above method, in the case where a user who owns a printer turns on the power of the printer for a purpose other than the printing instructed from the server, a job directed to the printer which was held in the server unintendedly starts executing the job at once. Accordingly, there arises a problem that the user is prevented from using the printer as intended.

Further, such a problem is not limited to the printing system including the printer and the server. In a processing system that includes other types of processing apparatuses and external apparatuses, a similar problem may arise in a form of the system in which the external apparatus notifies the processing apparatus of a job and the processing apparatus inquires of the external apparatus about job information based on such notification.

SUMMARY OF THE INVENTION

A processing apparatus according to the present invention connects to an external apparatus via a network and executes processing in accordance with a job transmitted from the external apparatus, and the processing apparatus includes a detection unit configured to detect a predetermined event and a transmission unit configured to transmit a request for the job to the external apparatus on a condition that a predetermined time has elapsed from the detection of the predetermined event by the detection unit.

Further features of the present invention will become apparent from the following description of exemplary embodiments (with reference to the attached drawings).

BRIEF DESCRIPTION OF THE DRAWINGS

FIG. 9 is a diagram showing the relationship of FIGS. 9A and 9B;

FIG. 9A is a flowchart showing processing of the MFP 300;

FIG. 10 is a sequence diagram in the case where a job is supplied from the terminal apparatus 200 after the power of the MFP 300 is turned on;

FIG. 11 is a sequence diagram in the case where a job is supplied from the terminal apparatus 200 while the MFP 300 is in a power-off state and then the power of the MFP 300 is turned on;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
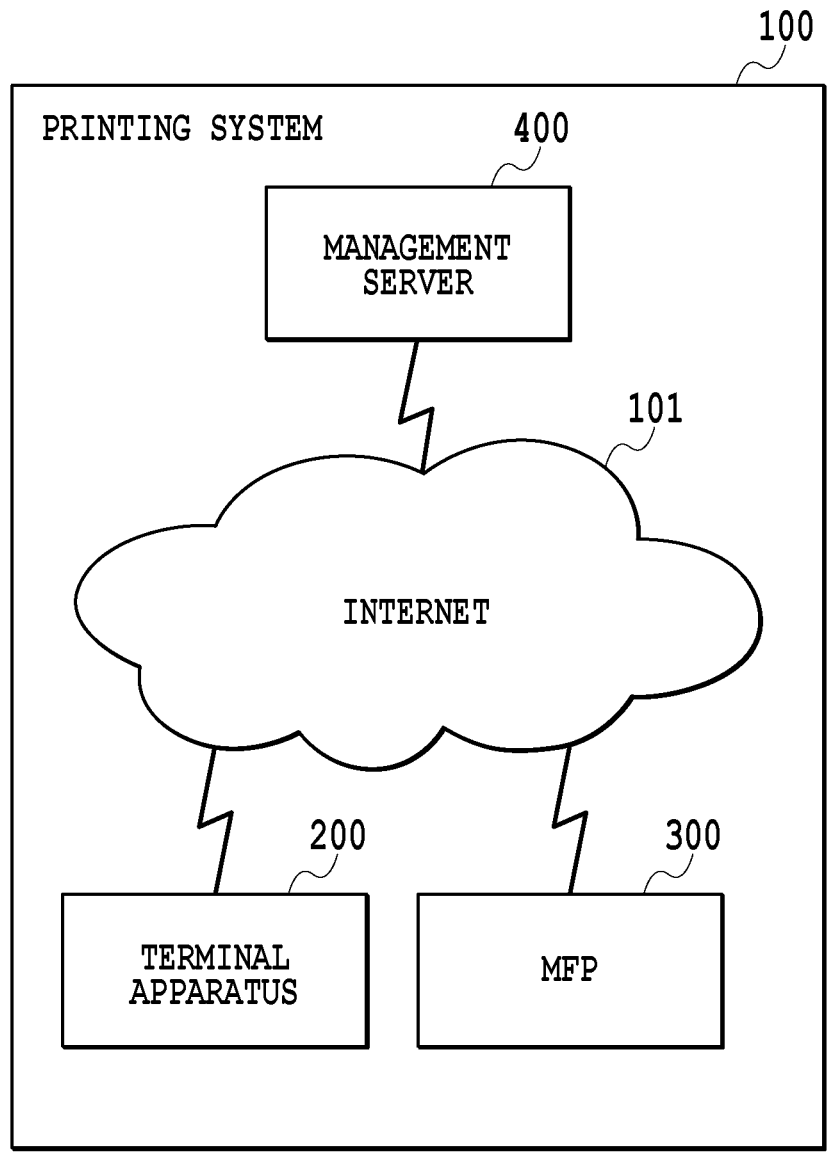
FIG. 1 is a diagram showing a configuration of a printing system 100 according to one embodiment of the present invention.

FIG. 1 is a diagram showing a configuration of a printing system 100 according to one embodiment of the present invention. In the printing system 100, a terminal apparatus 200, a Multifunction Printer 300 (hereinafter referred to as an "MFP 300") as a processing apparatus, and a management server 400 as an external apparatus are mutually connected to each other via an internet 101. Note that various apparatuses such as a personal computer and a digital camera may be used as the external apparatus.

The terminal apparatus 200 and the MFP 300 may be communicatably connected to each other on one LAN, or as shown in FIG. 1, may be communicatably connected to each other via the internet 101. In the case where the terminal apparatus 200 and the MFP 300 are connected via the internet 101, the terminal apparatus 200 and the MFP 300 may be located apart from each other for use. With respect to a configuration in which each of the terminal apparatus 200, the MFP 300, and the management server 400 is connected to the internet 101, existing techniques should be applied hereto. There are methods of using, for example, a cable LAN, a wireless LAN, and a portable phone line.

Furthermore, the management server 400 and the MFP 300 mutually establish an Extensible Messaging and Presence Protocol (XMPP) connection. Then, the management server 400 notifies the MFP 300 of the occurrence of a job by using an XMPP message. Since the management server 400 and the MFP 300 are connected via the internet 101, frequent job inquiries to the management server 400 by the MFP 300 increase overheads in making communications, thereby increasing traffic and server loads. Therefore, at the time of supplying a job by the terminal apparatus 200, job notification is transmitted from the management server 400 to the MFP 300, and, upon reception of this notification, the MFP 300 transmits to the management server 400 a request for transmitting job information. However, if the MFP 300 is in a power-off state, the XMPP is disconnected from the management server 400, whereby the management server 400 cannot transmit job notification to the MFP 300 in the case where the job is supplied while the MFP 300 is in the power-off state. In this regard, it may be possible to use a method in which the MFP 300 inquires a job at the time of turning on the power of the MFP 300.

However, for example, if a user turns on the power of the MFP 300 for a purpose other than the reception of a job from the management server 400, there may be a case where the job reception from the management server 400 and job execution are prioritized over the purpose of the user. For example, if the user turns on the power of the MFP 300 to use other functions such as copying operation, the unexecuted job held in the management server 400 unintendedly starts to be activated before executing desired processing through the user's operation of the desired function. In this regard, the MFP 300 according to the present embodiment inquires of the management server 400 about the job on a condition that a predetermined time has elapsed after the power is turned on.

Further, in the case where the MFP 300 makes job inquiry at the time of turning on the power of the MFP 300 and if jobs for multiple MFPs 300 are managed by one management server 400, the job inquiry is executed for every powered-on MFP 300. As a result, there may be an increase in the traffic and server loads. Particularly, in the case where multiple MFPs 300 are powered on at a time, jobs are inquired at a time, thereby increasing the traffic and server loads. For example, in the case where software updates are automatically executed on the MFPs 300, the MFPs 300 restart at a time, causing the increase in the traffic and server loads. According to the present embodiment, by setting the above predetermined time to have different values depending on each model of the MFPs 300 or each of the individuals, timings for making inquiries to the management server 400 may vary even if multiple MFPs 300 exist.

According to the present embodiment, explanations will be given below by showing examples to cope with this problem by controlling not to make the job inquiry immediately after turning on the power of the MFP 300. Further, the details will be described later.

Incidentally, FIG. 1 is described by exemplifying a configuration in which the MFP is used as a processing apparatus and the printing system is used as a processing system. However, it is not limited to this embodiment. The processing apparatus may be any apparatus other than the MFP as long as the processing apparatus performs various kinds of processing in accordance with a job transmitted from the management server.

Figure 2:
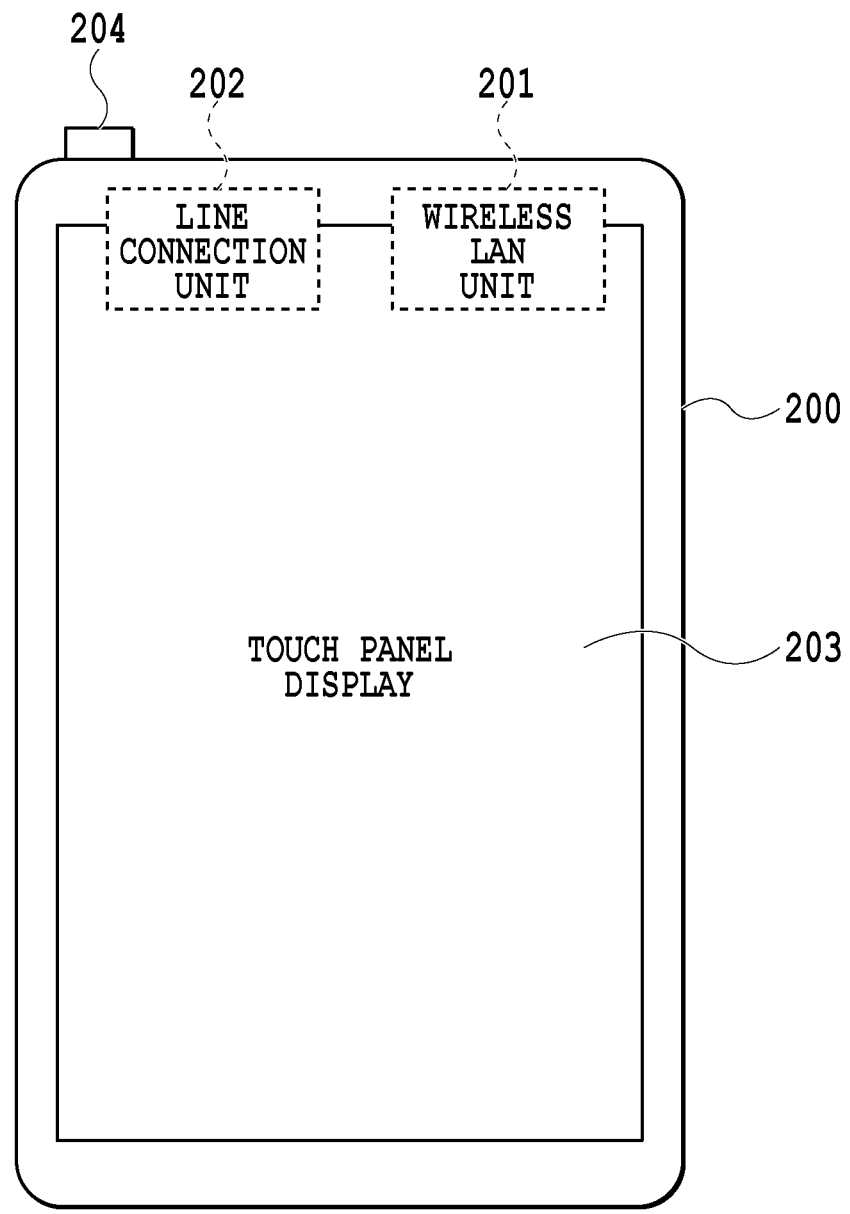
FIG. 2 is a view showing an appearance of a terminal apparatus 200.

FIG. 2 is a view showing an appearance of the terminal apparatus 200. According to the present embodiment, a form of using a smartphone as the terminal apparatus 200 will be explained. The smartphone is a multi-functional type portable phone including a camera, an Internet browser, and a mailing function besides the function of the portable phone. A wireless LAN unit 201 is a unit located in the apparatus for performing communications using a wireless LAN. A line connection unit 202 is a unit located in the apparatus for performing communications by connecting it to a portable phone line. A touch panel display 203 provided on the front face of the terminal apparatus 200 is equipped with an LCD type display mechanism and a touch-panel type operation mechanism. A representative operating method is that the user causes button-shaped operation parts to be displayed on the touch panel display 203 and makes touching operation on the touch panel display 203 to issue an event whose button is pressed. A power button 204 is used for turning on and off the terminal apparatus 200. Note that, although the example of the smartphone is described here, a tablet, a PC terminal, and other electronic equipment may also be used as the terminal apparatus 200.

Figure 3:
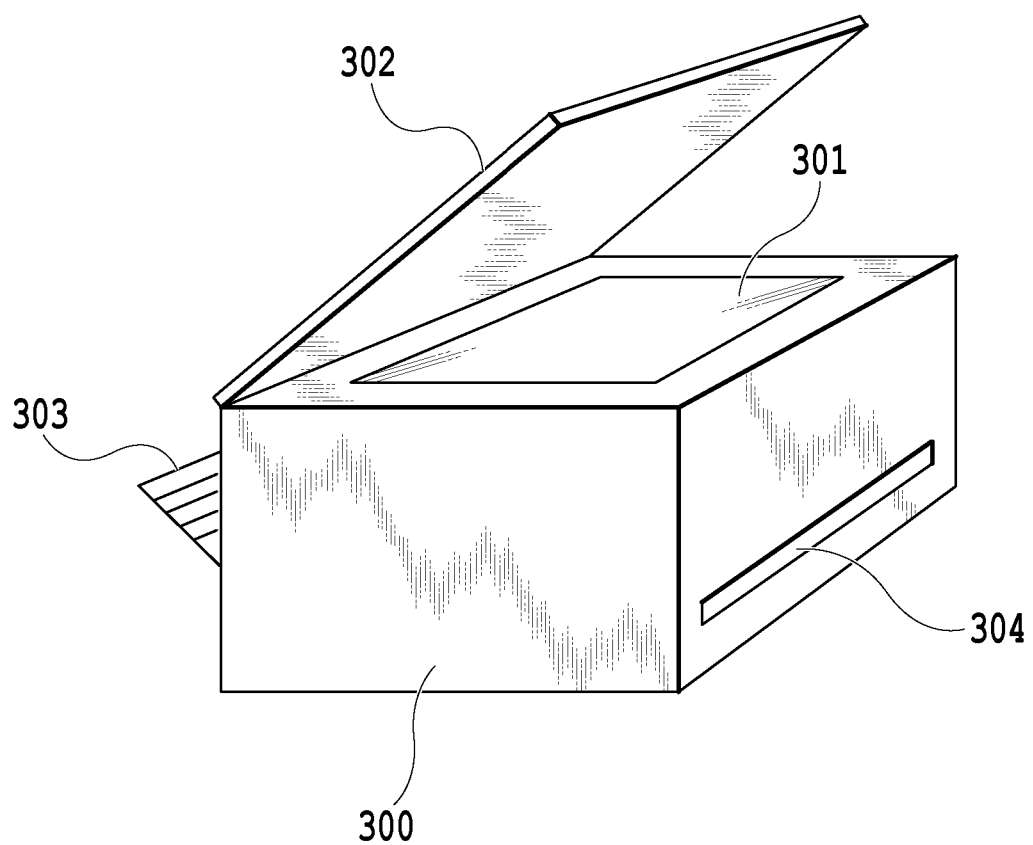
FIG. 3 is a view showing an appearance of an MFP 300.

FIG. 3 is a view showing an appearance of the MFP 300. According to the present embodiment, a multifunction printer (MFP) which includes a printing apparatus, a scanner, and other functions is exemplified. A document platen 301 is a transparent glass platen and is used for scanning a document placed thereon by the scanner. A document cover plate 302 is a cover which presses the document against the document platen to prevent the document from floating upon scanning by the scanner and which prevents light from outside from entering into a scanner unit. A print sheet insertion opening 303 is an opening to set various sizes of sheets. The sheets set on this opening are conveyed to a printing unit one by one to make desired printing, and are ejected from a print sheet output opening 304.

Figure 4:
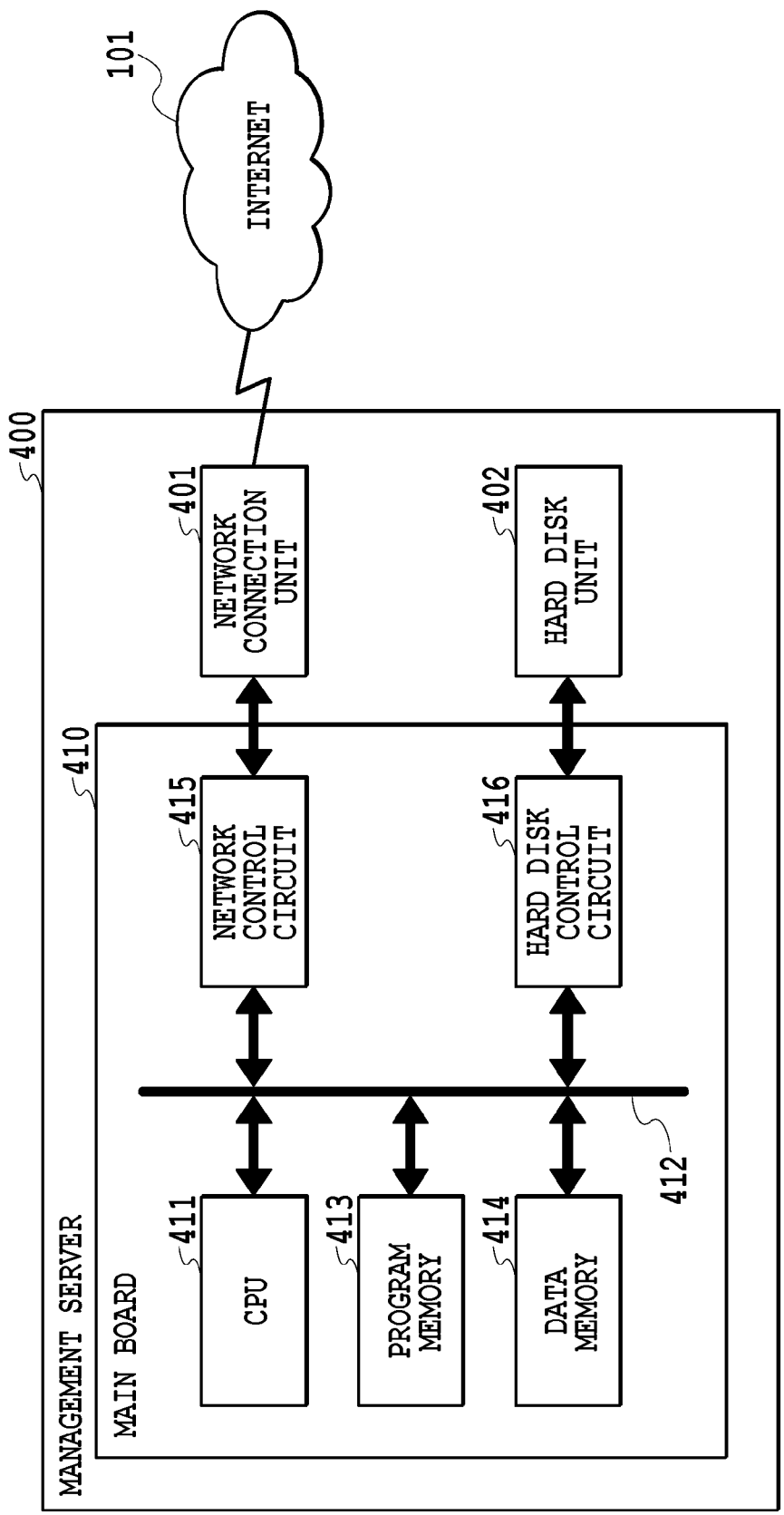
FIG. 4 is a block diagram showing a configuration of a control system of a management server 400.

FIG. 4 is a block diagram showing a configuration of a control system of the management server 400. The management server 400 includes a main board 410 which controls an entire apparatus of the server, a network connection unit 401, and a hard disk unit 402. A CPU 411 which is a microprocessor located in the main board 410 activates in accordance with a control program stored in a program memory 413 connected via an internal bus 412 and a content of a data memory 414 connected via the internal bus 412. The CPU 411 controls the network connection unit 401 via a network control circuit 415 so as to be connected to the internet 101 to make communications with other apparatuses. The CPU 411 can read/write data from/on the hard disk unit 402 connected via a hard disk control circuit 416. In the hard disk unit 402, an operating system loaded on the program memory 413 for use, control software for the management server 400, and various kinds of data are stored. Print job data received from the terminal apparatus 200 is stored in the hard disk unit 402 by means of identifying each MFP 300 that should execute the print job.

Figure 5:
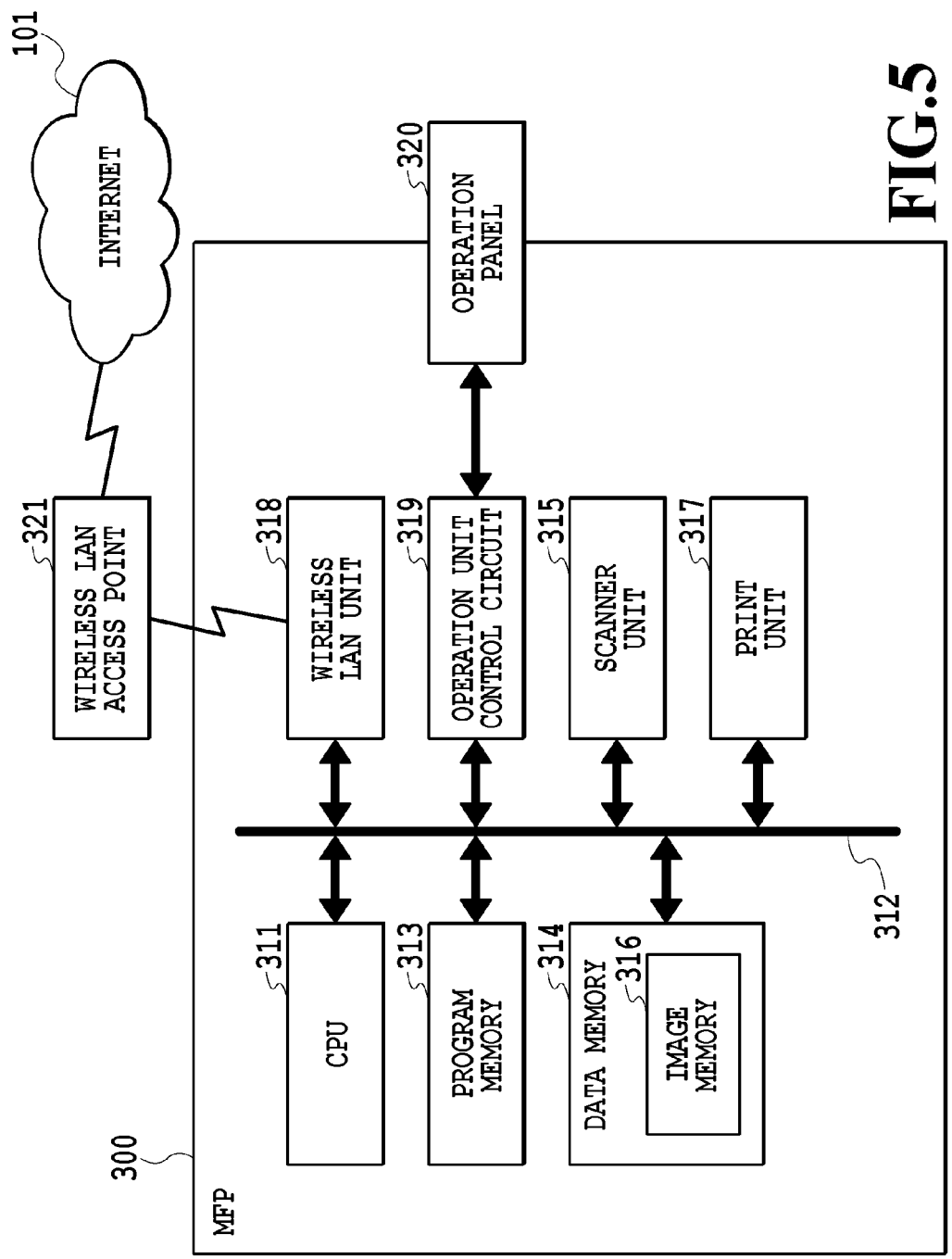
FIG. 5 is a block diagram showing a configuration of a control system of the MFP 300.

FIG. 5 is a block diagram showing a configuration of a control system of the MFP 300. A CPU 311 which is a microprocessor activates in accordance with a control program stored in a program memory 313 which is a ROM and is connected via an internal bus 312 and a content of a data memory 314 which is a RAM and is connected via the internal bus 312. The CPU 311 controls a scanner unit 315 to read a document and stores an image of the document in an image memory 316 provided in a data memory 314. In addition, the CPU 311 controls a print unit 317 to print an image in the image memory 316 provided in the data memory 314 on a print medium.

The CPU 311 controls a wireless LAN unit 318 so as to be connected to a wireless LAN access point 321 provided outside. The wireless LAN access point 321 is connected to the internet 101, and the CPU 311 of the MFP 300 is connected to the internet via the wireless LAN access point 321 to make communications with other apparatuses.

The CPU 311 can control an operation unit control circuit 319 so as to display a state of the MFP 300 and to display a function selection menu on an operation panel 320 provided on the outer face of the MFP 300 and so as to receive operation from a user. By combining the above configurations, the MFP 300 offers various functions to the user. For example, the MFP 300 can acquire a print job from the management server 400 connected via the internet 101 and execute printing on a print medium through the control of the print unit 317. Further, the MFP 300 controls the scanner unit 315 so as to transmit an image of a read document to the management server 400 or other apparatuses. Moreover, the MFP 300 can start its action upon receiving user input onto the operation panel 320, and can control the scanner unit 315 to execute a copying function by printing the image of the read document using the print unit 317.

Next, explanations will be given on a functional configuration and processing details of the management server 400.

Figure 6:
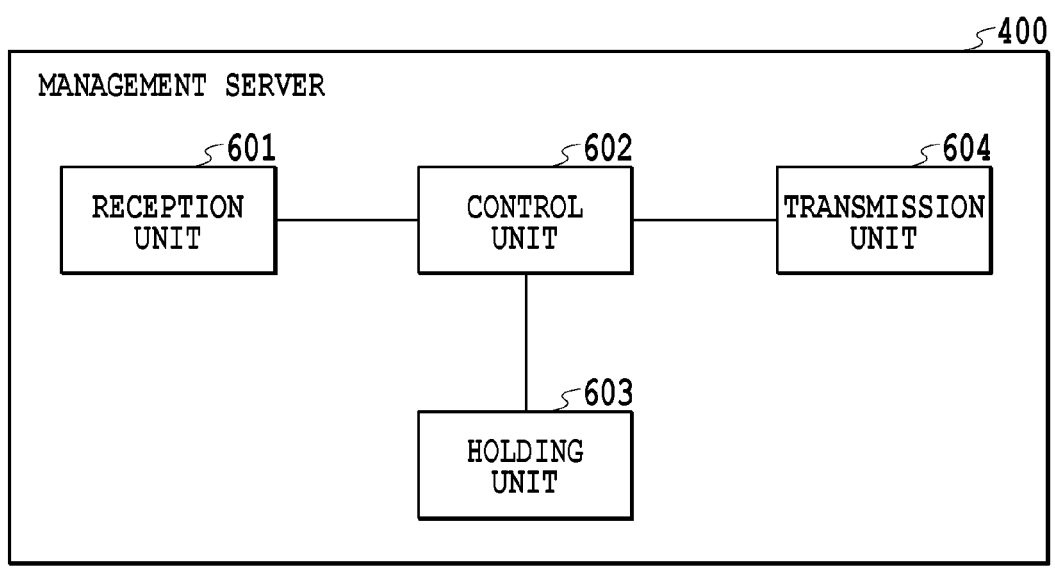
FIG. 6 is a block diagram showing a functional configuration of the management server 400.

FIG. 6 is a block diagram showing an example of the functional configuration of the management server 400. The management server 400 includes a reception unit 601, a control unit 602, a holding unit 603, and a transmission unit 604. The reception unit 601 receives various types of requests from the MFP 300 and receives jobs from the terminal apparatus 200. The control unit 602 controls to execute processing shown in a flowchart which will be described later. The holding unit 603 holds jobs transmitted from the terminal apparatus 200 by use of the hard disk unit 402. The transmission unit 604 transmits various types of information to the MFP. According to the present embodiment, the CPU 411 in the management server executes a program stored in the program memory 413 so that the CPU 411 functions as each of the functional units shown in FIG. 6.

Figure 7:
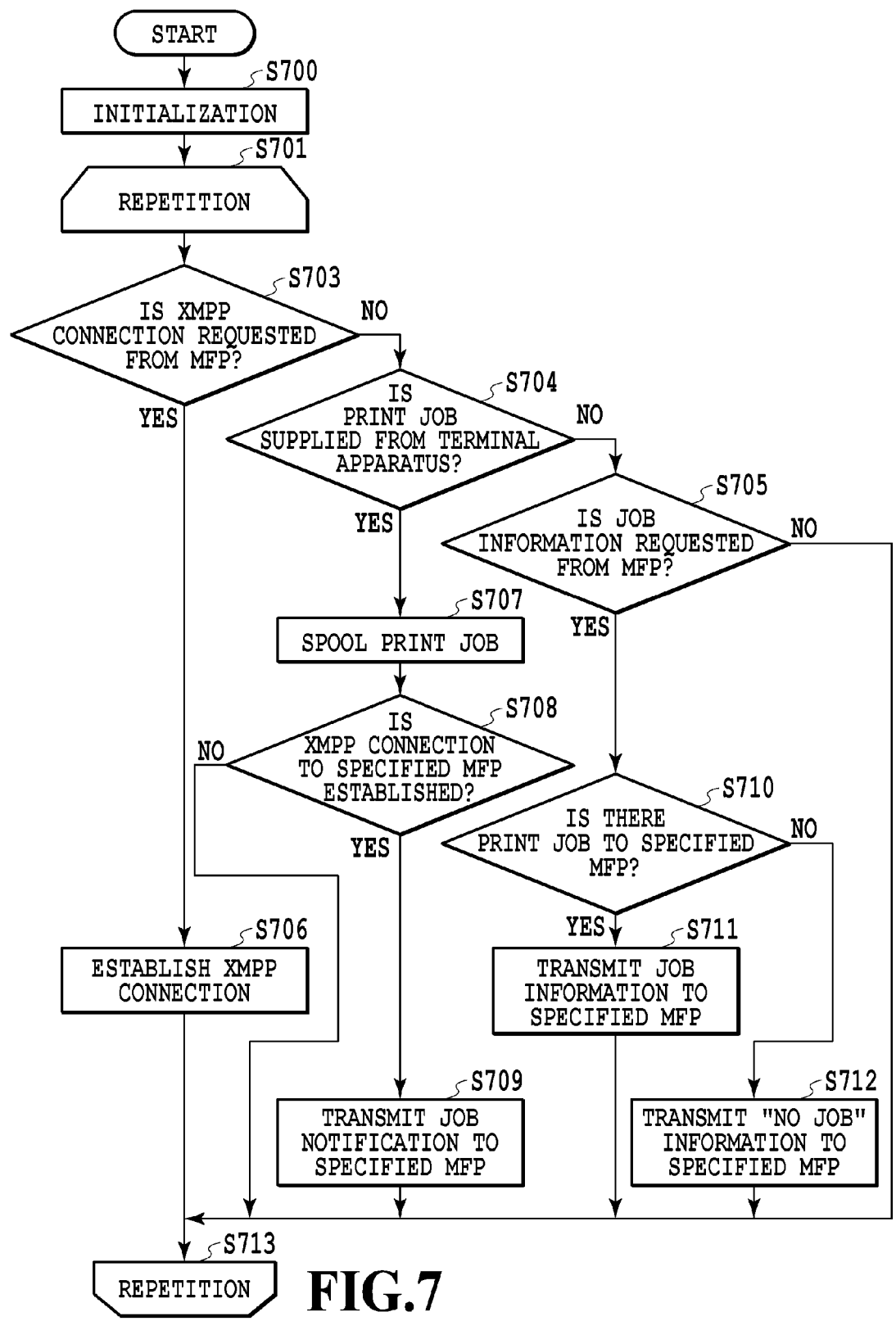
FIG. 7 is a flowchart showing processing of the management server 400.

FIG. 7 is a flowchart showing processing details of the CPU 411 in the management server 400. The processing according to this flowchart shows that once the management server 400 is activated and a control program of the management server 400 is activated, the CPU 411 functions as each of the units shown in FIG. 6 to start the processing.

The control unit 602 executes various kinds of initialization on the program to control the management server 400 in Step S700, and then, starts a repetition loop from Step S701 to Step S713. In the repetition loop, various events received from the outside by the reception unit 601 are detected in each of Step S703 through Step S705 and the control unit 602 performs processing in accordance with each event.

In Step S703, in the case where the reception unit 601 detects that an XMPP connection request has been received from the MFP 300 as an event, the control unit 602 proceeds to Step S706 to perform XMPP connection establishment processing on the MFP 300 who has transmitted the XMPP connection request. Otherwise, the control unit 602 proceeds to Step S704.

In Step S704, in the case where the reception unit 601 detects that a print job has been supplied from the terminal apparatus 200 as an event, the control unit 602 proceeds to Step S707. Otherwise, the control unit 602 proceeds to Step S705. In Step S707, the control unit 602 spools the supplied print job in the holding unit 603. In the following Step S708, the control unit 602 specifies the MFP 300 that should execute the supplied print job and determines whether an XMPP connection to the specified MFP 300 has already been established. If the XMPP connection has already been established, the process proceeds to Step S709. In Step S709, the control unit 602 uses an XMPP connection channel in which the connection to the specified MFP 300 is already established to transmit a message of job notification. Meanwhile, in Step S708, if the XMPP connection has not been established, the job notification is not given to the MFP 300. Here, the job notification message refers to a message to notify the occurrence of a job. On the other hand, job information, which refers to the content itself of a job, is transmitted from the management server 400 based on a request from the MFP 300 as will be described later in Steps S705 and S711.

In Step S705, in the case where the reception unit 601 detects that a job information request has been received from the MFP 300 as an event, the control unit 602 proceeds to Step S710. Otherwise, the control unit 602 returns to the repetition processing of Step S701. Here, the job information request refers to the content of the job itself, and is a request demanding transmission of a job (referred to as job information) managed in the management server 400 to the MFP 300. In Step S710, the control unit 602 specifies the MFP 300 who has transmitted the job information request, and determines whether the print job that should be executed in the specified MFP 300 is spooled (held) in the holding unit 603. In Step S710, in the case of determining that the print job for the specified MFP 300 is spooled, the process proceeds to Step S711, and the control unit 602 transmits the job information for the specified MFP 300 via an XMPP channel in which connection is established. Once the job information is transmitted, the control unit 602 deletes the job information spooled in the holding unit 603. Alternatively, the control unit 602 may delete the job information spooled in the holding unit 603 in the case where the management server 400 receives ACK information or the like indicating proper transmission of the job information after its transmission. Meanwhile, in Step S710, in the case of determining that there is no print job for the specified MFP 300, the process proceeds to Step S712, and the control unit 602 transmits information indicating "no job" as a response to the specified MFP 300.

Next, explanations will be given on the case of disconnecting the XMPP connection. For example, if the power of the MFP 300 is switched from on to off, disconnection processing is made, and the management server 400 acknowledges that the XMPP connection of the specified MFP 300 has been disconnected. Accordingly, the subsequent processing of the management server 400 for the MFP 300 who has made disconnection processing is as shown in FIG. 7. Meanwhile, there may be a case where the XMPP connection is disconnected due to abnormal events (e.g., breakage and drawn-out) instead of a normal disconnection sequence. In such a case, the management server 400 may not be able to identify the disconnection, and as a result, the management server 400 identifies that the XMPP connection to the specified MFP 300 is still established. Accordingly, if a print job is supplied from the terminal apparatus in this situation, the management server 400 transmits job notification as shown in S709. However, as a matter of course, the management server 400 receives no response from the MFP 300 and thus acknowledges that the XMPP connection to the specified MFP 300 is disconnected due to some kind of error such as a timeout.

Next, explanations will be given on a functional configuration and processing details of the MFP 300.

Figure 8:
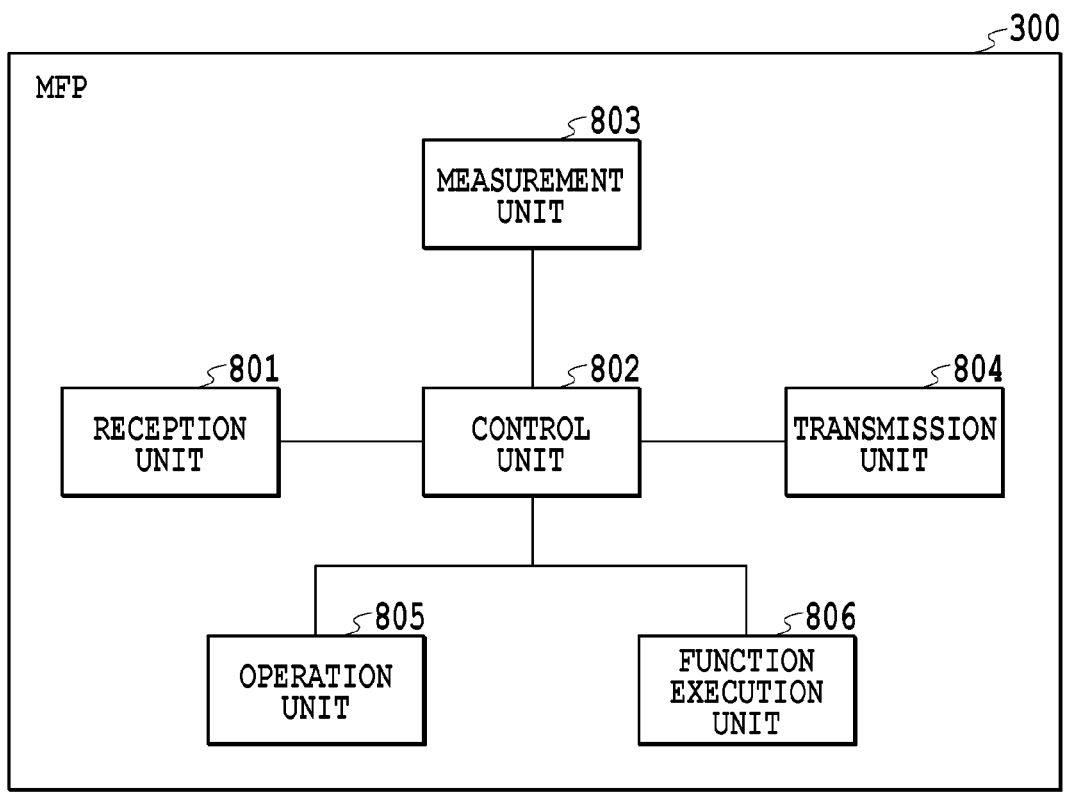
FIG. 8 is a block diagram showing a functional configuration of the MFP 300.

FIG. 8 is a block diagram showing an example of a functional configuration of the MFP 300. The MFP 300 includes a reception unit 801, a control unit 802, a counting unit 803, a transmission unit 804, an operation unit 805, and a function execution unit 806. The reception unit 801 receives job notification, job information, and the like from the management server 400. The control unit 802 makes control to execute processing which will be shown later in a flowchart. The counting unit 803 counts a period of time. Specifically, the counting unit 803 can count the period of time from the occurrence of various events such as, for example, the period of time from the power of the MFP 300 is turned on, the period of time from completion of initialization processing after the power is turned on, and the period of time from establishment of connection to the management server 400. The transmission unit 804 transmits various requests to the management server 400. The operation unit 805 receives operation by a user of the MFP 300 through the operation panel 320. The function execution unit 806 executes each of the functions included in the MFP 300 such as copying and scanning. According to the present embodiment, the CPU 311 in the MFP 300 executes the program stored in the program memory 313 so that the CPU 311 functions as each of the function units shown in FIG. 8.

Figure 9B:
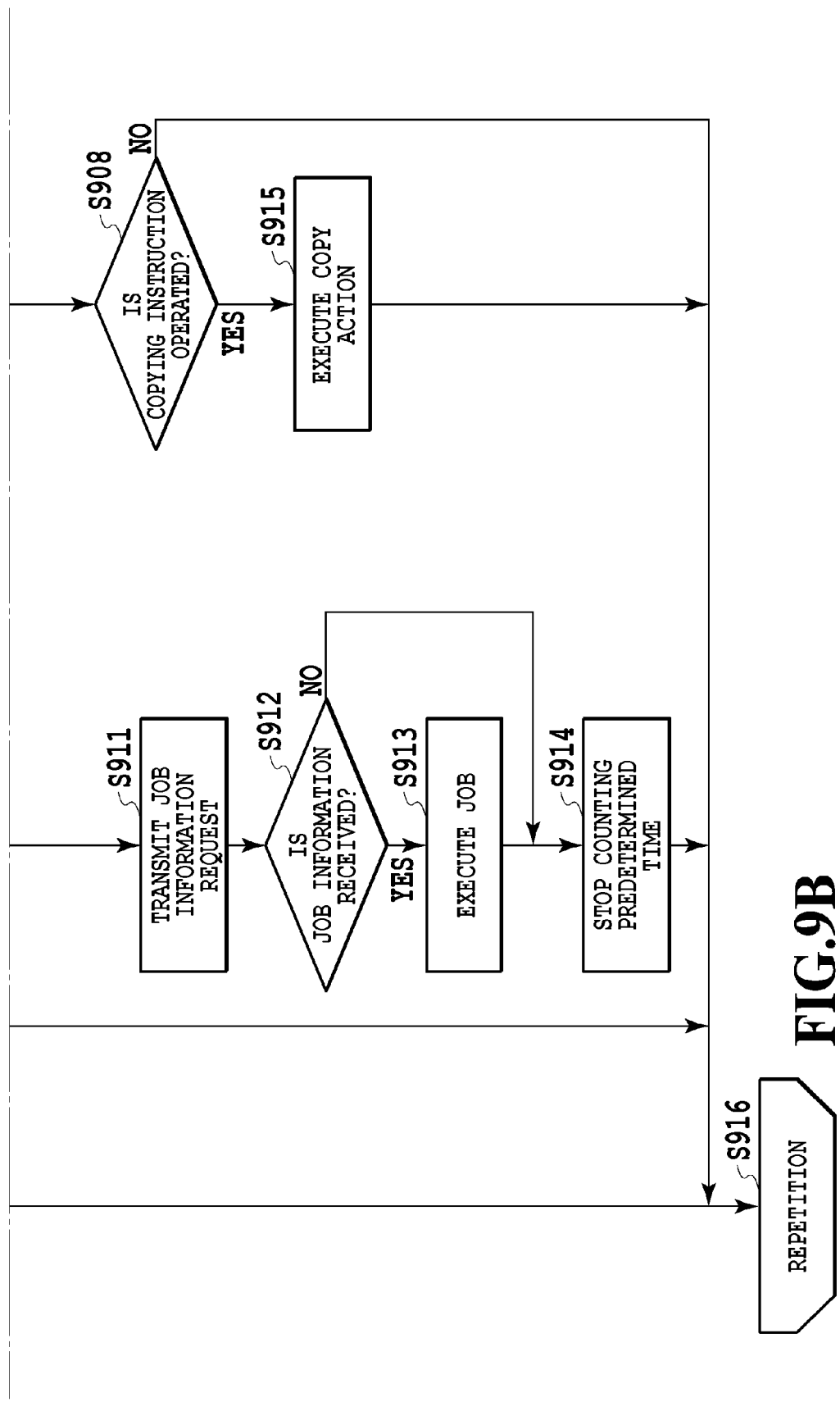
FIG. 9B is a flowchart showing processing of the MFP 300.

FIGS. 9A and 9B are flowcharts showing processing details of the CPU 311 in the MFP 300. The processing according to this flowchart shows that the MFP 300 is connected to an AC power supply, and once the control program of the MFP 300 activates, the CPU 311 functions as each of the units shown in FIG. 8 to start the processing. At this time, although the MFP 300 is connected to the AC power supply, the MFP 300 is in a power-off state in appearance and is in a so-called standby state with extremely small consumption power.

The control unit 802 executes various kinds of initialization processing on the MFP 300 in Step S900, and then, starts a repetition loop from Step S901 to Step S916. In the repetition loop, various events in the reception unit 801 from the outside, the counting unit 803, or the operation unit 805 are detected in each of Step S903 through Step S908 and the control unit 802 executes processing in accordance with each event.

In Step S903, in the case where the operation unit 805 detects that the operation of turning the power on through operation of the operation panel 320 as an event, the control unit 802 proceeds to Step S909. Otherwise, the control unit 802 proceeds to Step S904. In Step S909, the control unit 802 transmits an XMPP connection request to the management server 400 from the transmission unit 804. Once the management server 400 performs XMPP connection establishment processing in response to the XMPP connection request, the XMPP connection is established between the MFP 300 and the management server 400, and thus an event of the XMPP connection establishment is detected.

In Step S904, in the case where the reception unit 801 detects that the XMPP connection to the management server 400 has been established as an event, the control unit 802 proceeds to Step S910 and the counting unit 803 starts counting a predetermined time. Otherwise, the control unit 802 proceeds to Step S905. As a result of time counting started in Step S910 and the predetermined time has elapsed, a predetermined time elapsed event will be detected in the counting unit 803. As an example of the predetermined time, the time period between three minutes to five minutes is assumed, but is not limited to this. As will be described later, in the MFP 300, the lapse of this predetermined time is regarded as one condition to inquire a job information request to the management server 400. Due to such a configuration, in the case where a user turns on the power of the MFP 300 for the purpose other than job reception from the management server 400 or job execution, prioritizing the above immediate job reception and job execution over the user's purpose can be prevented. Accordingly, a sufficient time period required for the user to operate such other purposes besides job reception from the management server 400 and job execution can be appropriately set as the above predetermined time. This time period may be changed by the user by operating the operation panel 320 and the like.

In the case where the XMPP connection to the management server 400 is not established in the reception unit 801 as an event, the control unit 802 proceeds to Step S905.

In Step S905, in the case where the reception unit detects that a message of job notification is received from the management server 400 as an event using a connection-established XMPP channel, the control unit 802 proceeds to Step S911. Otherwise, the control unit 802 proceeds to Step S906. In Step S905, once the job notification message is received, the control unit 802 starts processing of acquiring the job. Specifically, in Step S911, the control unit 802 transmits a job information request to the management server 400 and receives its response. In a succeeding Step S912, the control unit 802 confirms the content of the response received as a result of Step S911 and determines whether the job information directed to the MFP 300 of its own has been received. In the case where the job information has been received, the control unit 802 proceeds to Step S913 and causes the function execution unit 806 to execute printing of the received job, and then proceeds to Step S914. Meanwhile, as a result of Step S912, in the case of receiving information indicating "no job," the control unit 802 proceeds to Step S914 without proceeding through Step S913. In Step S914, the counting stops for a predetermined time. A reason for stopping the counting for the predetermined time in Step S914 is that a situation whether a job is spooled in the management server 400 has already been confirmed in the processing of Steps S911 and S912. The above processing from Step S911 to Step S914 is hereinafter described as job inquiry processing.

In Step S906, in the case where the operation unit 805 detects that a job inquiry instruction is operated through operation of the operation panel 320 as an event, the control unit 802 proceeds to Step S911. Then, as in the case in which the job notification has been received, the job inquiry processing is executed. Otherwise, the control unit 802 proceeds to Step S907.

In Step S907, in the case where the counting unit 803 detects that a predetermined time has elapsed as an event, the control unit 802 proceeds to Step S911, and similarly, executes the job inquiry processing. Otherwise, the control unit 802 proceeds to Step S908.

In Step S908, in the case where the operation unit 805 detects that operation to instruct copy action execution is made through operation of the operation panel 320 as an event, the control unit 802 proceeds to Step S915 and executes copy action. Otherwise, the control unit 802 returns to Step S901 to perform repetition processing.

As illustrated in the processing in FIG. 9A, according to the processing of the present embodiment, the XMPP connection is established after the power of the MFP 300 is turned on, and then, the counting of the predetermined time is made. During this counting of the predetermined time, the MFP 300 does not transmit a job information request other than the case where an explicit job inquiry instruction is operated by the user through the operation panel 320 (S906). Therefore, even if the user turns on the power of the MFP 300 for another purpose (e.g., for copying), the user can achieve the other purpose before a job held in the management server is processed. Incidentally, there may be a case where job notification is transmitted from the management server 400 during the counting of this predetermined time. For example, in the case where the management server 400 establishes the XMPP connection to the MFP 300 and then a job for the MFP 300 is left in the management server 400, there may be a form in which the management server 400 transmits job notification despite the absence of an inquiry from the MFP 300. To be more specific, in the case where the job for the specified MFP 300 is apparently managed in the management server due to the reception of job notification from the management server 400, for example, the MFP 300 transmits a job information request. Further, once the job information request is transmitted, the counting of the predetermined time stops (S914), and thus, there is no need to make inquiry again caused by counting the predetermined time thereafter.

Meanwhile, in the case where the predetermined time has elapsed after the power is turned on (YES in S907), making an inquiry to the management server 400 can avoid failure of job notification.

Incidentally, job information transmitted by the management server 400 in S711 described above and received by the MFP 300 in S912 described above may be data to be printed such as an image and a text, or may be location information such as a URL indicating the location of a data storage. In the latter case, the management server 400 stores the data to be printed in a memory such as the hard disk unit 402 in the management server 400 or in a server outside the management server 400. Then, the management server 400 transmits the location information indicating the location of the storage to the MFP 300 in S711. In this case, in S913, the MFP 300 accesses the storage location of the data to be printed according to the received location information, acquires the data as a result of such access, and executes printing based on the acquired data. Further, the counting of the predetermined time may be started at the time of turning the power on (at the time of the start in the flowchart shown in FIG. 9A), or the counting may be started at the time of completion of the initialization processing in S900.

Explanations are given below on the entire processing flow of the printing system 100 according to the sequence diagram.

FIG. 10 is a sequence diagram in the case where a job is supplied from the terminal apparatus 200 after the MFP 300 is turned on. Note that, in FIGS. 10 through 13, a user 500 is exemplified for an explanation as the user of the terminal apparatus 200 and the MFP 300. However, since the terminal apparatus 200 and the MFP 300 are connected via the management server 400, the terminal apparatus 200 and the MFP 300 may be provided apart from each other, or may be owned by different users.

In Step S1001, the user 500 operates the operation panel 320 of the MFP 300 to turn on the power of the MFP 300. In accordance with the operation to turn on the power, the MFP 300 performs processing for a powered-on event and makes an XMPP connection request to the management server 400 in Step S1002. In response to the XMPP connection request, the management server 400 performs processing of an XMPP connection to establish the XMPP connection between the management server 400 and the MFP 300 in Step S1003. After establishment of the XMPP connection, the MFP 300 starts the counting of the predetermined time in Step S1004.

Next, in Step S1005, the user 500 operates the terminal apparatus 200 to perform printing of desired data. In accordance with the user's printing operation, the terminal apparatus 200 transmits a print job to the management server 400 in Step S1006. In response to the print job being transmitted, the management server 400 spools (holds) the print job in its own hard disk unit 402 in Step S1007. Then, in Step S1008, the management server 400 transmits job notification to the MFP 300. In accordance with the job notification being transmitted, the MFP 300 performs processing for a job notification reception event and transmits a job information request to the management server 400 in Step S1009. In response to the transmitted job information request, the management server 400 transmits the print job spooled in the hard disk unit 402 to the MFP 300 in Step S1010. The MFP 300 executes, upon reception of job information (print job), the print job in Step S1011, and simultaneously stops the predetermined time counting in Step S1012. Here, in the case where a plurality of print jobs for the specified MFP 300 are spooled, data on all print jobs may be transmitted as job information in Step S1010. In this case, the MFP 300 makes control so as to successively execute all print jobs. Alternatively, the MFP 300 may make control by transmitting the job information request every time one print job is accomplished and executing a next print job in succession if the next print job information exists.

Figure 11:
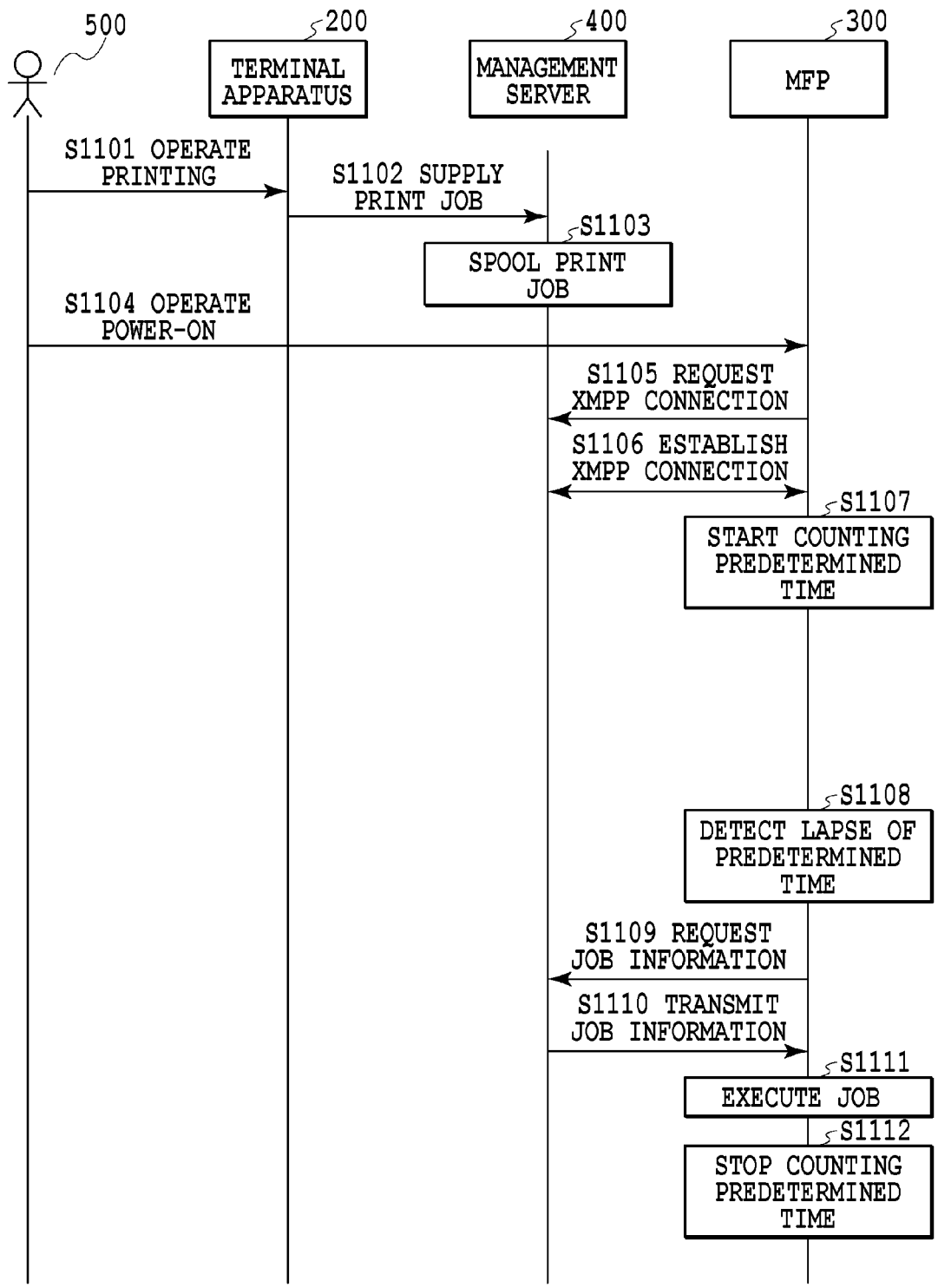

FIG. 11 is a sequence diagram in the case where a job is supplied from the terminal apparatus 200 while the MFP 300 is in a power-off state and the MFP 300 is powered on thereafter. In Step S1101, the user 500 operates the terminal apparatus 200 to perform printing of desired data. In accordance with the user's printing operation, the terminal apparatus 200 transmits a print job to the management server 400 in Step S1002. In response to the print job being transmitted, the management server 400 spools the print job to its own hard disk unit 402 in Step S1003. Here, the management server 400 is in a state where an XMPP connection is not established to the MFP 300, and thus, job notification for the MFP 300 is not transmitted at the moment. Next, in Step S1104, the user 500 operates the operation panel 320 of the MFP 300 to perform operation of turning on the power of the MFP 300. In accordance with the operation to turn on the power, the MFP 300 performs processing for the powered-on event and makes an XMPP connection request to the management server 400 in Step S1005. In response to the XMPP connection request, the management server 400 performs processing of the XMPP connection to establish the XMPP connection between the management server 400 and the MFP 300 in Step S1006. After establishment of the XMPP connection, the MFP 300 starts the counting of the predetermined time in Step S1107. Here, the print job supplied in Steps S1101 through S1102 at the time at which the MFP 300 is in a power-off state remains unexecuted and held in the management server 400 in the spooled state. After a lapse of predetermined time from the start of the predetermined time counting in Step S1107, a predetermined time lapse event is detected in Step S1108. In accordance with the detection of the predetermined time lapse event, the MFP 300 performs processing for the predetermined time lapse event, and transmits a job information request to the management server 400 in Step S1109. In response to this, the management server 400 transmits to the MFP 300 a print job spooled in the hard disk unit 402 in Step S1110. The MFP 300 executes, upon reception of job information (print job), the print job in Step S1111, and simultaneously stops the predetermined time counting in Step S1112.

As such, even in the case where the power of the MFP 300 is turned on after the print job is supplied in the power-off state, the print job is securely executed on a condition that a lapse of the predetermined time is detected. Meanwhile, from S1107 to S1108, a job information inquiry is not made to the management server 400, and thus, the user can cause the MFP 300 to perform desired processing during such a period, taking precedence over the job execution from the management server 400. The details will be described later with reference to FIG. 13.

Figure 12:
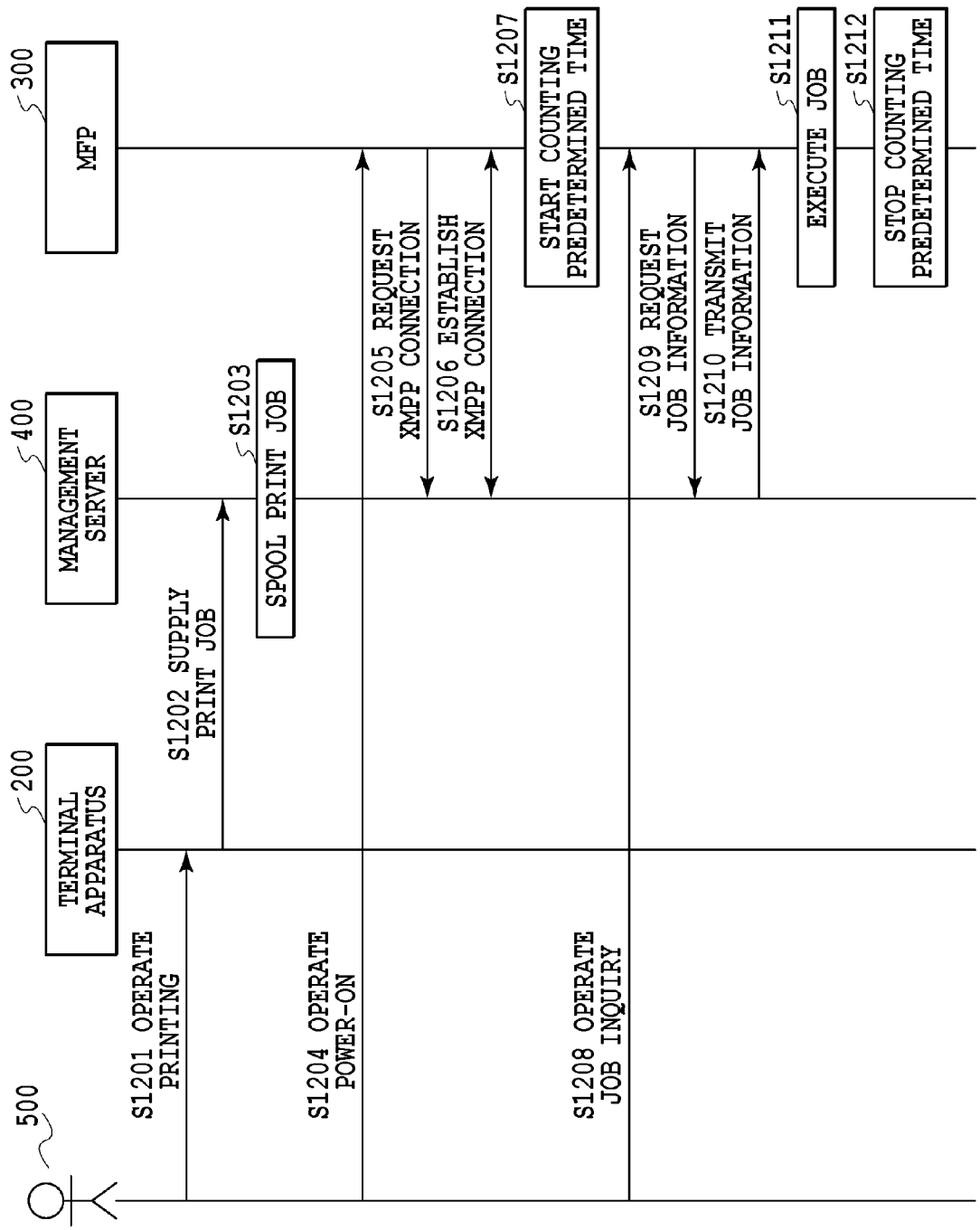
FIG. 12 is a sequence diagram in the case where a job is supplied from the terminal apparatus 200 while the MFP 300 is in a power-off state, then the power of the MFP 300 is turned on, and the job is inquired through operation of a panel of the MFP 300 before a lapse of predetermined time.

FIG. 12 is a sequence diagram in the case where a job is supplied from the terminal apparatus 200 while the MFP 300 is in a power-off state, the MFP 300 is powered on thereafter, and the job is inquired by operation of a panel of the MFP 300 before a lapse of predetermined time. Since the processing of Step S1201 through Step S1207 is identical to that of Step S1101 through Step S1107 in the earlier FIG. 11, the explanation will be omitted. Prior to the lapse of the predetermined time from the start of the predetermined time counting in Step S1207, the user 500 operates the operation panel 320 of the MFP 300 to operate job inquiry in Step S1208. In accordance with the operation of job inquiry, the MFP 300 performs processing for a job inquiry instruction operation event, and transmits the job information request to the management server 400 in Step S1209. In response to the job information request, the management server 400 transmits to the MFP 300 the print job spooled in the hard disk unit 402 in Step S1210. The MFP 300 executes, upon reception of job information (print job), the print job in Step S1211, and stops the predetermined time counting in Step S1212. As such, even in the case where the power of the MFP 300 is turned on after the print job is supplied, the user 500 can operate job inquiry on the operation panel 320 so as to immediately obtain a desired printing result.

Figure 13:
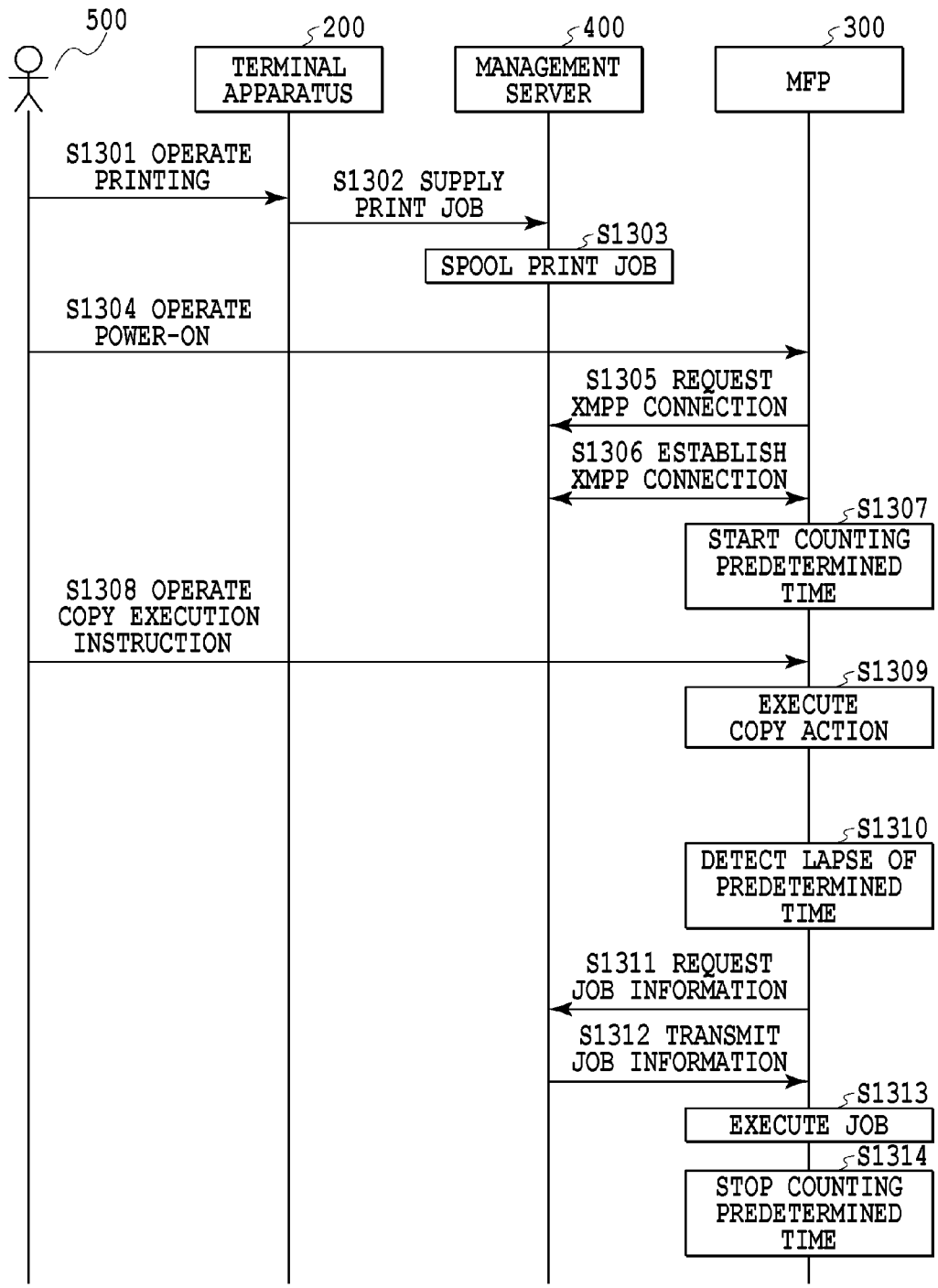
FIG. 13 is a sequence diagram in the case where a job is supplied from the terminal apparatus 200 while the MFP 300 is in a power-off state, and then the power of the MFP 300 is turned on to perform another printing operation.

FIG. 13 is a sequence diagram in the case where a job is supplied from the terminal apparatus 200 while the MFP 300 is in a power-off state, and the MFP 300 is powered on thereafter to perform another printing operation. Since the processing of Step S1301 through Step S1307 is identical to that of Step S1101 through Step S1107 in the earlier FIG. 11, the explanation will be omitted. Prior to a lapse of the predetermined time from the start of the predetermined time counting in Step S1307, the user 500 operates the operation panel 320 of the MFP 300 to make copying execution instruction in Step S1308. In accordance with the operation of the copying execution instruction, the MFP 300 performs processing for a copying execution instruction operation event and executes copy processing in Step S1309. After completion of the copying operation, the predetermined time is elapsed from the start of the predetermined time counting in Step S1307, and then a predetermined time lapse event is detected in Step S1307. In accordance with the detection of the predetermined time lapse event, the MFP 300 performs processing for the predetermined time lapse event, and transmits a job information request to the management server 400 in Step S1311. In response to the job information request, the management server 400 transmits to the MFP 300 a print job spooled in the hard disk unit 402 in Step S1312. The MFP 300 executes, upon reception of job information (print job), the print job in Step S1313, and simultaneously stops the predetermined time counting in Step S1314. As such, the print job spooled in the management server 400 will not be promptly executed immediately after turning on the power of the MFP 300, and thus, the user 500 can execute a desired copying function at once without being interrupted. Note that in the case where the predetermined time lapse event has occurred during the execution of copy processing in Step S1309, the predetermined time lapse event is detected after the completion of the copy processing. Therefore, the job inquiry processing after Step S1310 is executed after the completion of copy processing in Step S1309. Incidentally, in the case where the predetermined time lapse event has occurred during the execution of copying operation in Step S1309, it is possible to make control by restarting the predetermined time counting so as to delay the execution of the job inquiry processing. Specifically, in the case where printing function as a predetermined function of the processing apparatus is being used at the time at which the predetermined time has elapsed, the print job request may be controlled to be transmitted after the printing function becomes in an unused state. Alternatively, the print job may be executed after the MFP 300 makes the job information request in S1311 and receives data required for the execution of the print job and then after the completion of the copy processing by using the printing function. Further, there may be a case where a function in use at the time of occurrence of the predetermined time lapse event, for example, is a function that is not used for execution of a job (printing) from the management server 400 (e.g., scanning function). In this case, the function in execution does not overlap with the job from the management server 400, and thus, a job request or job execution may be promptly made without making standby for the job request or standby for the job execution as described above. Meanwhile, in the case where the function (printing function) to be used for execution (printing) of a job from the management server 400 is in use, standby for the job request or standby for the job execution as described above is made.

In making control as described above, a problem that an unexecuted job is still held in the management server 400, in the case where the power of the MFP 300 is turned on in the state in which the management server 400 fails to give job notification to the MFP 300, can be resolved. Further, in the case where the user turns on the power for the purpose of using another function such as copying operation, a problem that the unexecuted job held in the management server 400 starts to be activated before the user operates the desired function to execute desired processing can be resolved.

Further, in the case where the terminal apparatus 200 and the management server 400 as well as the management server 400 and the MFP 300 are connected via the internet and the MFP 300 is shared by a plurality of users, there may be a case where the user of the terminal apparatus 200 and the user of the MFP 300 are different in a certain timing. For example, assuming that a user A, who is positioned apart from the MFP 300, supplies a print job from the terminal apparatus 200 to the management server 400, and at the same time a user B, who is positioned near the MFP 300, turns on the power of the MFP 300 to perform copy processing without knowing that the user A has supplied the print job, and if the MFP 300 is powered on and promptly makes job inquiry to the management server 400, there may be a case where the job not known to the user B is prioritized over the copy processing desired by the user B.

Meanwhile, according to the processing of the present embodiment, as shown in FIG. 13, the MFP 300 can execute copy processing desired by the user B on a priority basis.

Incidentally, in the explanation of the present embodiment, as a timing in which the MFP 300 makes job inquiry to the management server 400, the case of the timing in which the predetermined time has elapsed from the establishment of the XMPP connection has been introduced, but other timings may also be used. For example, the case may include timing in which the MFP 300 is transited to a power-saving mode or timing in which the MFP 300 recovers from the power-saving mode as conditions. The case may also include timing in which an idling state with no activation of the MFP 300 continues for a predetermined time as a condition. Alternatively, the case may also include timing in which a state without operation to the operation panel 320 continues for a predetermined time as a condition. Further, a condition of the combination of the above timings may be used. Specifically, the MFP 300 can execute processing of inquiring a job in the case where the predetermined time has elapsed after the detection of a predetermined event.

Furthermore, in the explanation of the present embodiment, the case of the print job for printing on a print medium by the print unit 317 of the MFP 300 as a type of a job to be transmitted from the management server 400 and executed by the MFP 300 has been introduced, but other types of jobs may also be used. For example, a scan job in which an image read from a document by the scanner unit 315 is sent to the management server 400 may be considered. Moreover, upon receiving notification on the print job and scan job, the MFP 300 may be controlled to achieve simultaneous parallel activation.

Also, in the explanation of the present embodiment, the example of the copying function as a function to be executed by the function execution unit 806 before the lapse of the predetermined time has been introduced, but such a function is not limited to this.

Other Embodiments

In the earlier first embodiment, the example of the multifunction printer (MFP) equipped with the printing apparatus, scanner, and other functions as a processing apparatus has been explained, but there may be a case of using other processing apparatuses having functions other than printing function and scanning function. Also, the case where the management server 400 and the MFP 300 are connected via the internet 101 has been mainly explained, but these apparatuses may be in a configuration that is directly connected to each other via a local network.

Further, in the first embodiment, the example of using the XMPP as a protocol to establish a session between the MFP and the management server has been explained, but such a protocol is not limited to this. Other protocols may be used to establish a session and exchange information.

Moreover, in the first embodiment, the example of processing to start establishment of the XMPP connection in the case where the power of the MFP is turned on has been explained, but the processing to be a trigger of starting the establishment of the XMPP connection is not limited to the case where the power is turned on. For example, in the case where the MFP activates while a network function is in a disabled state and then the network function is enabled, processing to start establishing the XMPP connection to the management server is made by the MFP. Alternatively, also in the case where the power of the wireless LAN access point 321 is switched from off to on, the processing to start establishing the XMPP connection to the management server is made by the MFP. Further, in accordance with an instruction given from a user through the operation panel 320, processing to start establishing the XMPP connection to the management server is made by the MFP. Alternatively, to cope with abnormal disconnection of the XMPP connection, the MFP may periodically output requests of establishing the XMPP connection. As such, the processing according to the first embodiment is not limited to processing in the case where the power of the MFP is turned on, but can be replaced with the case of starting the establishment of the XMPP connection by various triggers as described above.

Incidentally, the "predetermined time" is not required to have the common value for the entire processing apparatus included in the system. From the viewpoint of traffic diffusion, there may be a configuration in which the predetermined time is set to have different values with some extent of dispersion among the processing apparatuses included in the system.

Also, the management server 400 described above may be configured to have one server apparatus or there may be a case where a server system including a plurality of server apparatuses activates as the above-described management server 400. In the case of the latter, the above-mentioned plurality of functions in the management server 400 are appropriately shared by the plurality of server apparatuses.

The present invention can be achieved by supplying a program to realize one or more functions according to the above embodiments to a system or an apparatus via a network or a storage medium and by processing to read or execute the program by one or more processors in the computer of the system or the apparatus. Further, the present invention can be achieved by a circuit (e.g., ASIC) to realize one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a problem that processing of job execution transmitted from an external apparatus starts even if a user turns the power of the processing apparatus on for a purpose other than executing the job can be alleviated. Further, in the case where there is unprocessed job in the external apparatus, the job will be automatically executed after a lapse of predetermined time without being recognized by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-015078, filed Jan. 29, 2016, which is hereby incorporated by reference wherein in its entirety.

What is claimed is:

1. A printing apparatus which is connected to a server system via a network and executes printing in accordance with a print job transmitted from the server system, the printing apparatus comprising:
   a memory configured to store a program;
   a processor configured to execute the program stored in the memory; and
   a printing mechanism configured to execute printing,
   wherein the processor detects a predetermined event about a status of the printing apparatus; and
   wherein the processor transmits a request for the print job which is supplied to the server system from a terminal apparatus, to the server system, on a condition that a predetermined time has elapsed from the detection of the predetermined event, and
   wherein the printing mechanism executes printing, in accordance with the print job which is transmitted to the printing apparatus from the server system based on the request.

2. The printing apparatus according to claim 1, wherein the processor detects that a session to make connection to the server system via the network has been established as the predetermined event.

3. The printing apparatus according to claim 2, wherein the processor detects that, as the predetermined event, the session for connecting to the server system via the network has been established after a power of the printing apparatus is turned on.

4. The printing apparatus according to claim 2, wherein the establishment of the session is an establishment of an XMPP connection to the server system.

5. The printing apparatus according to claim 1, further comprising an operation panel configured to receive, from a user, an instruction to inquire of the server system about the print job,
   wherein the processor transmits, in a case of receiving the instruction from the operation panel, a request to the server system for the print job regardless of a lapse of the predetermined time.

6. The printing apparatus according to claim 1, further comprising an operation panel configured to receive, from a user, an instruction to execute a function included in the printing apparatus,
   wherein the processor does not transmit, even in a case of receiving the instruction from the operation panel, a request to the server system for the print job until the predetermined time has elapsed.

7. The printing apparatus according to claim 1, wherein the processor receives from the server system a print job notification to notify the printing apparatus of the occurrence of a print job, and
   wherein the processor transmits, in a case of receiving the print job notification, the request to the server system for the print job regardless of a lapse of the predetermined time.

8. The printing apparatus according to claim 1, wherein the predetermined event includes an event in which the printing apparatus transitions to a power-saving mode.

9. The printing apparatus according to claim 1, wherein the predetermined event includes an event in which the printing apparatus recovers from a power-saving mode.

10. The printing apparatus according to claim 1, wherein the predetermined event includes an event in which the printing apparatus is in an idling state with no activation for a predetermined duration.

11. The printing apparatus according to claim 1, wherein the predetermined event includes an event in which a panel of the printing apparatus has not been operated for a predetermined duration.

12. The processing apparatus according to claim 1,
   further comprising a reading mechanism configured to execute reading of a document,
   wherein the processor transmits a request for a scan job which is supplied to the server system from the terminal apparatus, to the server system, on a condition that the predetermined time has elapsed from the detection of the predetermined event, and
   wherein the reading mechanism executes reading of the document, in accordance with the scan job which is transmitted to the printing apparatus from the server system based on the request, and the processor sends an image read by the reading mechanism, to the server system.

13. The printing apparatus according to claim 1, wherein, in a case where a predetermined function by the printing mechanism is in use at the time at which the predetermined time has elapsed after detecting the predetermined event, the processor transmits the request for the print job after the predetermined function has come to an unused state.

14. The printing apparatus according to claim 1, wherein
   in a case where a predetermined function by the printing mechanism is in use at the time at which the predetermined time has elapsed after detecting the predetermined event, the processor transmits the request for the print job after the predetermined function has come to an unused state, and
   in a case where another function in which the printing mechanism is not used, is in use, the processor transmits the request for the print job without waiting until the another function has come to an unused state.

15. The printing apparatus according to claim 1, wherein the server system is a management server.

16. A control method of controlling a printing apparatus which is connected to a server system via a network and executes processing in accordance with a print job transmitted from the server system, the control method comprising the steps of:
   detecting, by a processor of the printing apparatus, a predetermined event about a status of the printing apparatus;

transmitting, by the processor, a request to the server system for the print job which is supplied to the server system from a terminal apparatus, on a condition that a predetermined time has elapsed from the detection of the predetermined event in the detecting step; and executing printing, by a printing mechanism of the printing apparatus, in accordance with the print job which is transmitted from the server system based on the request.

17. A control method of controlling a printing apparatus in a printing system, the printing system including a terminal apparatus, a server system connected to the terminal apparatus via a network, and the printing apparatus connected to the server system via the network, the control method comprising the steps of:

detecting, by a processor of the printing apparatus, a predetermined event about a status of the printing apparatus;

executing, by the processor of the printing apparatus, a job inquiry to the server system for a print job which is transmitted to the server system by the terminal apparatus and is spooled to the server system, on a condition that a predetermined time has elapsed from the detection of the predetermined event in the detecting step;

transmitting, by a processor of the server system, the spooled print job to the printing apparatus based on the job inquiry executed in the executing step; and executing printing, by a printing mechanism of the printing apparatus, in accordance with the print job transmitted to the printing apparatus from the server system in the transmitting step.

\* \* \* \* \*